(12) United States Patent
Pinel et al.

(10) Patent No.: US 11,157,931 B2
(45) Date of Patent: Oct. 26, 2021

(54) PREDICTING THE CROWDEDNESS OF A LOCATION

(71) Applicant: INTERNATIONAL BUSINESS MACHINES CORPORATION, Armonk, NY (US)

(72) Inventors: Florian Pinel, New York, NY (US); Tova Roth, Woodmere, NY (US)

(73) Assignee: International Business Machines Corporation, Armonk, NY (US)

( * ) Notice: Subject to any disclaimer, the term of this patent is extended or adjusted under 35 U.S.C. 154(b) by 246 days.

(21) Appl. No.: 16/106,883

(22) Filed: Aug. 21, 2018

(65) Prior Publication Data

US 2020/0065840 A1   Feb. 27, 2020

(51) Int. Cl.
| | |
|---|---|
| *H04W 4/021* | (2018.01) |
| *G06N 20/00* | (2019.01) |
| *H04W 4/02* | (2018.01) |
| *G06K 9/00* | (2006.01) |
| *G06Q 30/02* | (2012.01) |

(52) U.S. Cl.
CPC ..... *G06Q 30/0205* (2013.01); *G06K 9/00228* (2013.01); *G06K 9/00778* (2013.01); *G06N 20/00* (2019.01); *G06Q 30/0201* (2013.01); *H04W 4/02* (2013.01); *H04W 4/021* (2013.01); *A63B 2220/14* (2013.01); *G06K 9/00671* (2013.01)

(58) Field of Classification Search
CPC combination set(s) only.
See application file for complete search history.

(56) References Cited

U.S. PATENT DOCUMENTS

| | | | |
|---|---|---|---|
| 7,774,001 B2 * | 8/2010 | Richey | G06Q 20/202 |
| | | | 455/456.1 |
| 8,612,533 B1 | 12/2013 | Harris et al. | |
| 9,171,461 B1 | 10/2015 | Dabell | |
| 9,661,463 B2 * | 5/2017 | Aas | H04W 4/021 |
| 9,875,431 B2 * | 1/2018 | Ikeda | G06N 20/00 |
| 10,909,462 B2 * | 2/2021 | Ghose | G06Q 30/0201 |
| 2005/0206534 A1 | 9/2005 | Yamane et al. | |
| 2006/0004511 A1 | 1/2006 | Yoshikawa et al. | |

(Continued)

FOREIGN PATENT DOCUMENTS

| | | | | |
|---|---|---|---|---|
| JP | H04213575 A | 8/1992 | | |
| WO | WO2021011992 A1 * | 4/2020 | | G06Q 50/26 |

OTHER PUBLICATIONS

T. Davchev, M. Burke and S. Ramamoorthy, "Learning Structured Representations of Spatial and Interactive Dynamics for Trajectory Prediction in Crowded Scenes," in IEEE Robotics and Automation Letters, vol. 6, No. 2, pp. 707-714, Apr. 2021, doi: 10.1109/LRA.2020.3047778. (Year: 2021).*

(Continued)

*Primary Examiner* — Crystol Stewart
(74) *Attorney, Agent, or Firm* — James W. Kappos

(57) ABSTRACT

Embodiments of the present invention disclose a method, a computer program product, and a computer system for predicting a crowdedness of a location. In the example embodiment, a computer receives a location and defines a geofence around the location. In addition, the computer collects current feature data of users within the geofence and predicts a crowdedness of the location based on inputting the current feature data into a model.

11 Claims, 5 Drawing Sheets

(56) References Cited

U.S. PATENT DOCUMENTS

| | | | |
|---|---|---|---|
| 2007/0003141 A1* | 1/2007 | Rittscher | G06K 9/00778 |
| | | | 382/181 |
| 2007/0142065 A1* | 6/2007 | Richey | G06Q 20/202 |
| | | | 455/457 |
| 2007/0208492 A1 | 9/2007 | Downs et al. | |
| 2014/0172477 A1* | 6/2014 | Goulart | G06Q 10/06311 |
| | | | 705/7.13 |
| 2015/0058345 A1* | 2/2015 | Mishra | G06Q 30/0261 |
| | | | 707/737 |
| 2015/0227851 A1* | 8/2015 | Kaisser | H04W 4/029 |
| | | | 706/12 |
| 2015/0256632 A1 | 9/2015 | Harris et al. | |
| 2015/0304815 A1* | 10/2015 | Ghose | H04W 4/023 |
| | | | 455/456.3 |
| 2015/0381380 A1 | 12/2015 | Harris et al. | |
| 2016/0171546 A1 | 6/2016 | Gartenberg et al. | |
| 2016/0261984 A1* | 9/2016 | Shrinath | H04W 4/021 |
| 2016/0321548 A1* | 11/2016 | Ziskind | G06N 7/005 |
| 2016/0335552 A1* | 11/2016 | Longo | G06N 20/00 |
| 2016/0358190 A1* | 12/2016 | Terrazas | G06F 16/29 |
| 2017/0039661 A1 | 2/2017 | Vanslette et al. | |
| 2017/0124378 A1* | 5/2017 | High | G06Q 10/06315 |
| 2017/0178054 A1* | 6/2017 | Bury | G06Q 10/067 |
| 2017/0345265 A1* | 11/2017 | Zhao | G06K 9/00778 |
| 2017/0364817 A1* | 12/2017 | Raykov | G06Q 10/00 |
| 2018/0121577 A1* | 5/2018 | Taylor | G06Q 10/04 |
| 2018/0158322 A1* | 6/2018 | McDonnell | H04W 4/025 |
| 2018/0189669 A1* | 7/2018 | Jeon | G06Q 10/047 |
| 2018/0225687 A1* | 8/2018 | Ahmed | G06Q 30/0205 |
| 2018/0315502 A1* | 11/2018 | Wang | G06Q 10/06311 |
| 2018/0349808 A1* | 12/2018 | Sahadi | G06Q 50/14 |
| 2018/0374109 A1* | 12/2018 | Scarpati | G06N 20/00 |
| 2019/0012547 A1* | 1/2019 | Togashi | G06K 9/00778 |
| 2019/0147368 A1* | 5/2019 | Pinel | G06N 20/00 |
| | | | 706/12 |
| 2019/0215660 A1* | 7/2019 | Slushtz | H04W 4/021 |
| 2019/0325239 A1* | 10/2019 | Meyer | H04W 4/021 |
| 2020/0389762 A1* | 12/2020 | Akinci | H04W 4/021 |

OTHER PUBLICATIONS

Packd, www.packd.org, "Predict Your Day and Grow Your Business", printed Mar. 20, 2018, pp. 1-4.

Dale, "Placemeter wants to know how crowded a place is before you go", http://technical.ly/brooklyn/2014/02/24/placemeter/, Feb. 24, 2014, pp. 1-6.

Brandom, "Google Search can now tell you when a store gets crowded", https://www.theverge.com/2015/7/28/9059923/google-search-crowds-lin . . . Jul. 28, 2015, pp. 1-3.

Verizon, "New Social App Lets You See How Crowded a Place is Before You Go | . . . ", http://www.verizon.com/about/news/vzw/2015/09/new-social-app-lets-y . . . , printed Mar. 20, 2018, pp. 1-11.

Olanoff, "FoursCrowd Shows You Crowded Foursquare Locations to Flock to or Stay Away From", http://thenextweb.com/apps/2012/01/04/fourscrowd-shows-you-crowded-foursquare-locations-to-flock-to-or-stayaway-from/#gref, Jan. 4, 2012, pp. 1-9.

Mell et al., "The NIST Definition of Cloud Computing", National Institute of Standards and Technology, Special Publication 800-145, Sep. 2011, pp. 1-7. Regards.

* cited by examiner

PREDICTING THE CROWDEDNESS OF A LOCATION

BACKGROUND

The present invention relates generally to data analytics, and more particularly to predicting the crowdedness of a place of interest.

The crowdedness of a place of interest can often times be dependent on a variety of factors, including the time of the day, day of the week, time of the year, proximity to holidays, changes in weather, shows/events, and the like. The amount and nature of these factors make it difficult to assess the crowdedness of a place of interest at any given time, and even more difficult to predict the future crowdedness of said place of interest.

SUMMARY

Embodiments of the present invention disclose a method, a computer program product, and a computer system for predicting the crowdedness of a location. In the example embodiment, the invention includes receiving a location and predicting a crowdedness of the location based on a model.

In various embodiments, the model may be trained by defining one or more geofences around one or more locations and defining one or more features of the one or more locations. Moreover, training the model further includes collecting historic data relevant to the one or more features within the one or more geofences and calculating one or more coefficients corresponding to the one or more features based on the collected historic data.

According to some embodiments, predicting the crowdedness of the location based on the model further comprises collecting current data relevant to the one or more features within a geofence of the location and inputting the current data into the model.

Moreover, in embodiments, collecting historic data relevant to the one or more features within the one or more geofences further comprises filtering non-consumers present within a geofence of the location from the collected historic data and normalizing the collected historic data.

According to embodiments of the invention herein, the one or more features of the one or more locations are selected from the group consisting of a number of users during a same N day period in a prior year, a number of users on a N most recent same week days, a number of users in a past N days, a number of users on a same N day period in a prior month, the number of users a day before, a number of users within an N mile radius within a past day, a percent chance of precipitation, a temperature, a windspeed, a humidity, a UV index, a time of sunrise, and a time of sunset.

In embodiments, the invention further comprises outputting the predicted crowdedness of the location as a metric selected from the group consisting of a number of estimated users, a percentage indicative of crowdedness relative to average crowds, a ratio of users to an area of a geofence of the location, a ratio of users to employees of the location, and a ratio of users to parking.

Lastly, in some illustrative embodiments, the invention further comprises periodically retraining the model based on a feature selected from the group consisting of seasons, holidays, annual events, and sporting events.

BRIEF DESCRIPTION OF THE SEVERAL VIEWS OF THE DRAWINGS

The following detailed description, given by way of example and not intended to limit the invention solely thereto, will best be appreciated in conjunction with the accompanying drawings, in which.

The drawings are not necessarily to scale. The drawings are merely schematic representations, not intended to portray specific parameters of the invention. The drawings are intended to depict only typical embodiments of the invention. In the drawings, like numbering represents like elements.

DETAILED DESCRIPTION OF THE SEVERAL VIEWS OF THE DRAWINGS

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to implement such feature, structure, or characteristic in connection with other embodiments whether or not explicitly described.

In the interest of not obscuring the presentation of embodiments of the present invention, in the following detailed description, some processing steps or operations that are known in the art may have been combined together for presentation and for illustration purposes and in some instances, may have not been described in detail. In other instances, some processing steps or operations that are known in the art may not be described at all. It should be understood that the following description is focused on the distinctive features or elements of various embodiments of the present invention.

Figure 1:
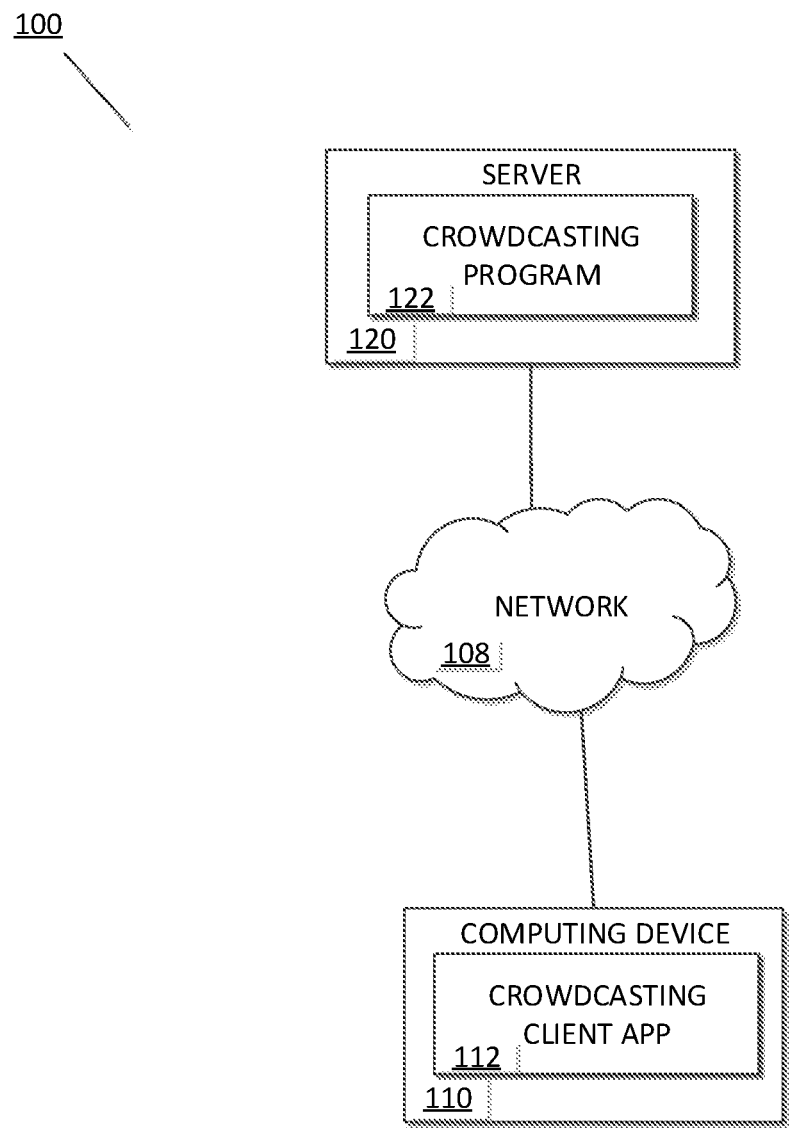
FIG. 1 depicts a schematic diagram of a crowdcasting system 100, in accordance with an embodiment of the present invention.

FIG. 1 depicts the crowdcasting system 100, in accordance with embodiments of the present invention, which presents a solution for predicting the crowdedness of a location, or place of interest. In the example embodiment, the crowdcasting system 100 includes at least one of a computing device 110 and a server 120, all interconnected via a network 108.

In the example embodiment, the network 108 is a communication channel capable of transferring data between connected devices. In the example embodiment, the network 108 may be the Internet, representing a worldwide collection of networks and gateways to support communications between devices connected to the Internet. Moreover, the network 108 may include, for example, wired, wireless, or fiber optic connections which may be implemented as an intranet network, a local area network (LAN), a wide area network (WAN), or a combination thereof. In further embodiments, the network 108 may be a Bluetooth network, a Wifi network, or a combination thereof. In yet further embodiments, the network 108 may be a telecommunications network used to facilitate telephone calls between two or more parties comprising a landline network, a wireless network, a closed network, a satellite network, or a combination thereof. In general, the network 108 can be any combination of connections and protocols that will support communications between the computing device 110 and the server 120.

In the example embodiment, the computing device 110 includes a crowdcasting client application 112 and may be a server, a laptop computer, a notebook, a tablet computer, a netbook computer, a personal computer (PC), a desktop computer, a personal digital assistant (PDA), a rotary phone, a touchtone phone, a smart phone, a mobile phone, a virtual device, a thin client, or any other electronic device or computing system capable of receiving and sending data to and from other computing devices. While the computing device 110 is shown as a single device, in other embodiments, the computing device 110 may be comprised of a cluster or plurality of computing devices, working together or working separately. The computing device 110 is described in greater detail with reference to FIG. 3.

The crowdcasting client application 112 is a software application that extracts data corresponding to a user of the computing device 110 and communicates the data with the crowdcasting program 122. In the example embodiment, the crowdcasting client application 112 may be downloaded via the network 108 or otherwise loaded onto the computing device 110 and allows for the crowdcasting program 122 to retrieve temporal and spatial data of the computing device 110, such as global positioning system (GPS) data, elevation data, accelerometer/gyroscope data, time data, etc., as well as various other data, such as wireless connection data. In some embodiments, the crowdcasting client application 112 may further extract user personal data, such as that detailed by a social media platform, including user demographic data such as gender, age, domicile, etc., as well as other information such as interests, hobbies, friends, schedule/calendar, profession, education, etc. In some embodiments, the crowdcasting client application 112 may be further configured to receive user input and be connectively coupled to hardware components, such as those depicted by FIG. 3, including mice, keyboards, touchscreens, microphones, cameras, and the like. In embodiments, the crowdcasting client application 112 may be implemented via a standalone application or via partial or full integration with another application, for example through a web browsing application.

In the example embodiment, the server 120 includes a crowdcasting program 122 and may be a server, a laptop computer, a netbook computer, a personal computer (PC), a desktop computer, a personal digital assistant (PDA), a rotary phone, a touchtone phone, a smartphone, a mobile phone, a virtual device, a thin client or any other electronic device or computing system capable of receiving and sending data to and from other computing devices. While the server 120 is shown as a single device, in other embodiments, the server 120 may be comprised of a cluster or plurality of computer devices, working together or working separately. The server 120 is described in greater detail with reference to FIG. 3.

The crowdcasting program 122 is a software application that is capable of determining an area of interest and measuring user activity within the defined geofence of the place of interest. In addition, the crowdcasting program 122 is capable of normalizing and filtering the measurements taken within the place of interest, as well as calculating features and training one or more models describing patterns in crowdedness of the place of interest. Lastly, the crowdcasting program 122 is capable of receiving a place of interest and a time, and based on the trained one or more models predicting the crowdedness of the place of interest.

Figure 2:
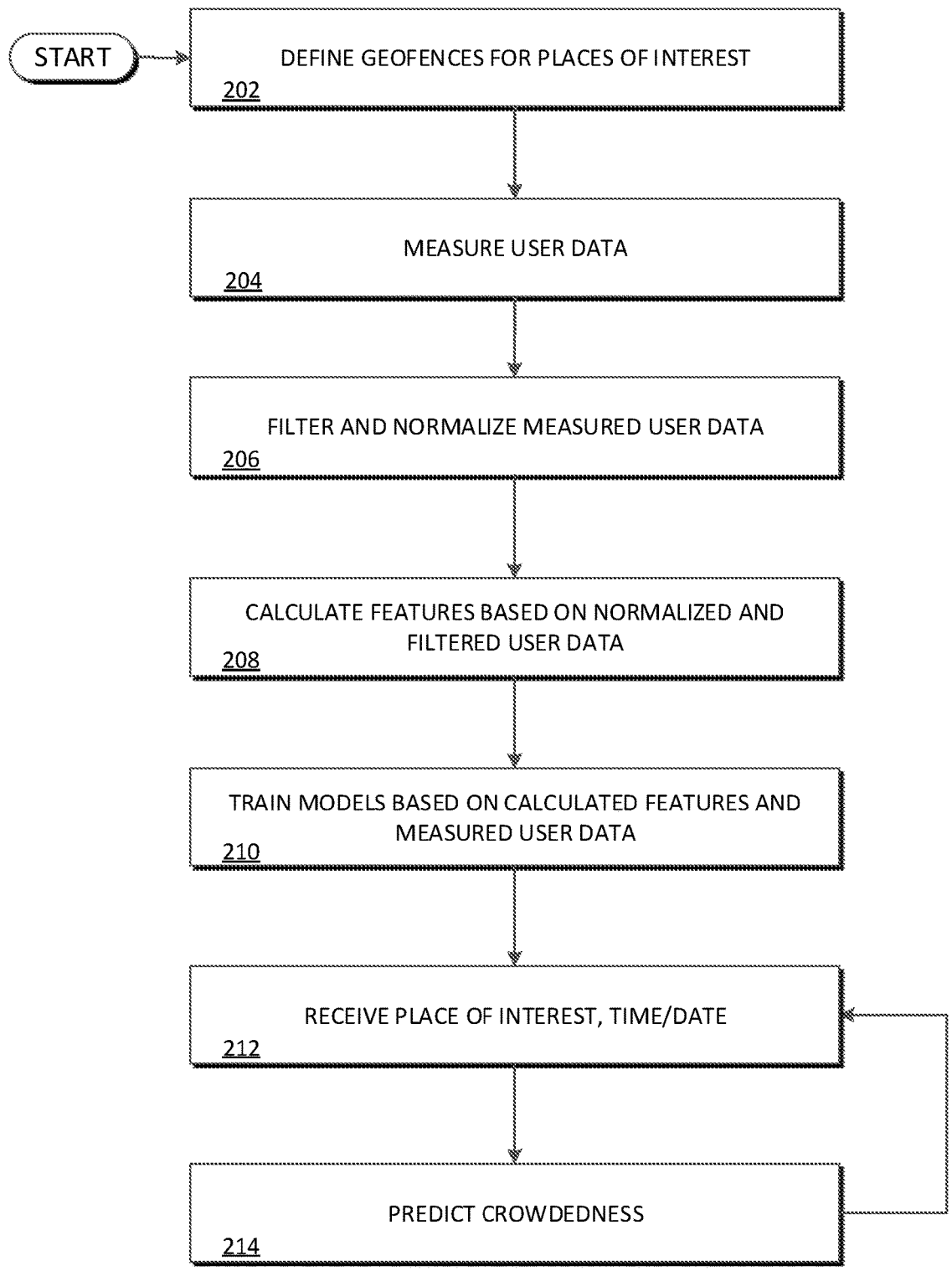
FIG. 2 depicts a flowchart illustrating the operations of a crowdcasting program 126 of the crowdcasting system 100 in predicting the crowdedness of a place of interest, in accordance with an embodiment of the present invention.

FIG. 2 illustrates the operations of the crowdcasting program 122 of the crowdcasting system 100 in predicting the crowdedness of a place of interest.

The crowdcasting program 122 defines one or more geofences for one or more places of interest (step 202). In general, a geofence is a virtual geographic boundary, defined by a GPS or radio frequency identification (RFID) technology, that enables software to trigger a response when a device enters or leaves a particular area. Geofences may be defined around buildings, homes, parks, beaches, golf courses, streets, and, generally, any places of interest to a user within the granularity of the system defining the boundary. In the example embodiment, the crowdcasting program 122 may use several methods to define a geofences for a given point of interest. In some embodiments, the crowdcasting program 122 may implement image recognition technology on satellite imagery to define a polygon around a larger point of interest, such as a golf course, mall, park, or beach. In such embodiments, the crowdcasting program 122 may define the geofence as the perimeter of the building itself or up to the curtilage of the property, for example the outer bounds of an associated parking lot, field, or lake/ocean. In some embodiments, the crowdcasting program 122 may further cross-reference the identified point of interest with a map or other reference to modify or confirm the defined geofence, for example to confirm the identity/location of a place of interest, to determine how many places of interest may occupy a single building/plaza, to determine whether an adjacent parking lot or picnic area, etc. is shared by multiple places of interest, and to determine a type of a place of interest (restaurant, fitness center, school, office building, etc.).

In other embodiments, the crowdcasting program 122 may alternatively, or in addition, define the geofence for a place of interest by considering a radius around a point of interest provided by a mapping application. For example, the crowdcasting program 122 may identify locations to geofence by referencing GPS coordinates or a street address of a place of interest, then define the geofence a prescribed circumference around the GPS coordinates or street address. In order to properly size the geofence around the point of interest, the crowdcasting program 122 may consider the distance to one or more adjacent places of interest or street addresses, and modify the geofence accordingly. For example, the crowdcasting program 122 may define the geofence for adjacent places of interest as equidistant from both places of interest, or up to an adjacent street or other feature, as determined by reference to satellite imagery. In yet further embodiments, the crowdcasting program 122 may define a geofence around a place of interest by receiving user input, for example through input of GPS coordinates of the place of interest and an appropriate radius or shape in which to extend the geofence. Importantly, the crowdcasting program 122 is configured to distinguish between places of interest located on top of one another through use of data analytics, for example analysing altitude data, accelerometer/gyroscope data, wireless connection data, and reference to databases such as websites and directories describing the places of interest.

With reference to an illustrative example, the crowdcasting program 122 retrieves a satellite image illustrating a beach, a gym, a two-story building, and a strip mall having a clothing store, dry cleaner, and deli. Based on the satellite image, the crowdcasting program 122 defines a geofence around the beach extending from an adjacent parking lot to the ocean, and around the gym extending to the parking lot curtilage. In addition, the crowdcasting program 122 defines a geofence around each of the clothing store, dry cleaner, and deli by refencing a map having the coordinates of each of the stores within the strip mall and drawing the geofence halfway between each of the adjacent coordinates. Notably, the crowdcasting program 122 omits drawings the geofence for any of the strip malls places of interest around the strip mall parking lot, as the crowdcasting program 122 determines based on the map that the parking lot is shared between all three places of interest. In further embodiments, however, the crowdcasting program 122 may include the parking lot within the geofences of all the strip mall places of interest and reference place of interest data to determine which place of interest a user is frequenting, for example by referencing business hours data of the places of interest or profile data of the user. Lastly, the crowdcasting program 122 defines a geofence around the two-story building and parking lot based on the satellite imagery, and additionally references a business directory to determine that a second-floor apartment complex sits on top of a first-floor restaurant.

The crowdcasting program 122 measures user data (step 204). In the example embodiment, the crowdcasting program 122 measures user data via communication with the crowdcasting client application 112 and may be configured to measure user data on a periodic, scheduled, or trigger-based basis. The crowdcasting program 122 extracts information such as temporal and spatial data of the computing device 110, such as global positioning system (GPS) data, elevation data, accelerometer/gyroscope data, time data, etc., as well as various other data, such as wireless connection data. In some embodiments, the crowdcasting client application 112 may further extract user personal data, such as that illustrated by a social media platform, including user demographic data such as gender, age, domicile, etc., as well as other information such as interests, hobbies, friends, schedule/calendar, profession, education, etc., which may be considered in determining a most likely place of interest a user is frequenting.

Continuing the example above having the beach, gym, two-story building, and strip mall, the crowdcasting program 122 measures user data corresponding to 200 users within the geofence of the beach, 50 users within the geofence of the gym, 30 users within the geofence of the two-story building, and 15 users within the geofence of the strip mall.

The crowdcasting program 122 filters and normalizes the measured user data (step 206). In the example embodiment, the crowdcasting program 122 may be configured to filter out user data irrelevant to crowdedness, as well as normalize user data to account for application penetration. For example, the crowdcasting program 122 may filter out user data corresponding to non-consumers or users otherwise irrelevant to crowdedness at the point of interest, such as employees, idle devices, and residents in the near proximity of a place of interest. In order to filter such user data, the crowdcasting program 122 may be configured to identify and filter data from devices that remain within the place of interest for more than a threshold percentage X of time. In such embodiments, a user may define an absolute or relative time period threshold X manually or, alternatively, the crowdcasting program 122 may base it off of a metric autonomously. For example, the crowdcasting program 122 may filter corresponding user data if the computing device 110 remains at the place of interest for X percent of regular business hours, in perpetuity (X=100), is present for an eight-hour shift, or is consistently present on the same days/times/weeks. In other embodiments, the crowdcasting program 122 may filter user data in order to isolate and distinguish visitors of a particular place of interest from those of another places of interest, for example in multi-floor or closely-adjacent building scenarios. For example, when geofences are directly adjacent or overlap, the crowdcasting program 122 may take into consideration locational business hours and attribute user data within overlapping regions to only those businesses that are open. Similarly, the crowdcasting program 122 may identify residents within residential units on-top of or adjacent to points of interest by identifying users present when the adjacent or on-top of place of interest is closed. Alternatively, the crowdcasting program 122 may reference user profile data to determine a more likely location of a user when geofences conflate. In further embodiments, the crowdcasting program 122 may be configured to corroborate such assumptions by referencing user data, for example an accelerometer/gyroscope to determine when a user is in an elevator or stairwell in multi-floor scenarios. Alternatively, the crowdcasting program 122 may reference connected networks, for example Wi-Fi, Bluetooth, or NFC connections to determine which place of interest the user is frequenting.

In furthering the previously drawn out example where the second-floor apartment complex sits on top of the first-floor restaurant, the crowdcasting program 122 may determine that user data of the computing device(s) 110 that are idle within the geofence of the two-story building after midnight are likely to correspond to sleeping users, and even more likely considering the first-floor restaurant closes at midnight. Accordingly, the crowdcasting program 122 identifies and removes these user data from the data used in predicting the crowdedness of the first-floor restaurant during open business hours.

In addition, the crowdcasting program 122 normalizes the measured user data (step 206 continued). In the example embodiment, the crowdcasting program 122 normalizes the user data to account for an increase in users of the crowdcasting client application 112, a concept known as application penetration. Restated, because the crowdcasting program 122 bases crowdedness predictions on a number of registers users within a place of interest, the crowdcasting program 122 must adjust crowdedness estimation algorithms as the registered user base increases. For example, an increased number of users detected at a place of interest does not necessarily mean that the particular place of interest is more crowded than usual, but can instead indicate that more users who frequent the place of interest have downloaded and are using the crowdcasting client application 112, i.e., a greater application penetration. Accordingly, the crowdcasting program 122 normalizes the user data by proportionally applying normalization factors to the user data based on application penetration within that application penetration area. Generally speaking, the greater the application penetration in a given application penetration area, the more the crowdedness predictions must be reduced for the places of interest to which the users from that application penetration area visit. Moreover, the application penetration area can be adjusted to a desired granularity, for example by the country, state, county, city, point of interest, etc. In the example embodiment, the crowdcasting program 122 determines an application penetration of an application penetration area by analysing a distribution of downloads and/or home locations of users. Using similar methods to that described above, the crowdcasting program 122 is capable of determining when and where the computing device 110 corresponding to a user is idle, for example during night hours, and infer that the user is at a domicile.

In the example above, for instance, where crowdcasting program 122 measures 200 users at the beach, if the number of registered users of the crowdcasting client application 112 doubles and the measured visitors to the beach triples, the crowdcasting program 122 normalizes the user data to reflect that predictions of beach goers are inflated due to a one hundred percent increase in the use of the crowdcasting client application 112, and may conclude that the number of beach goers increased by one hundred fifty percent. Moreover, if crowdcasting program 122 determines that 100 of the beachgoers are from out of town, then crowdcasting program 122 adjusts crowdedness predictions for places of interest having the visitors from out of town.

The crowdcasting program 122 calculates features (step 208). In the example embodiment, the crowdcasting program 122 calculates features indicative of crowdedness using a combination of historical crowdedness data, weather forecast data, and crowd migration data. In the example embodiment, the crowdcasting program 122 utilizes the measured user data to calculate features for each place of interest and computes both a daily forecast and a same-day hourly forecast.

To obtain the daily forecast (step 208 continued), the crowdcasting program 122 obtains feature data for a number of users during the same N day period in the year before (e.g., N=10), a number of users on the N most recent days (e.g., N=2-3), the number of users in the past N days (e.g., N=10), the number of users on the same N day period the month before (e.g., N=5), the number of users the day before, as well as the weather forecast for that day, which may include a percent chance of precipitation, temperature, windspeed, humidity, UV index, time of sunrise, time of sunset, etc. The variable N can be defined as any integer and can be varied for each of the features, places of interest, etc. as granularly as desired.

To obtain the same day hourly forecast (step 208 continued), crowdcasting program 122 obtains data for the same features as above, and additionally obtains data relating to the number of users within an N mile radius within the past 24 hours Like above, the variable N can be defined as any integer and can be a different integer for each feature. All feature data is then scaled/normalized. In further embodiments, the crowdcasting program 122 may further take into account other features when training the model. For example, the crowdcasting program 122 may consider mentions of the place of interest in an associated social media profile. Such mentions may occur in posts, reposts, shares, tags, and other social media functionality. In addition, the crowdcasting program 122 may be configured to identify a date or scheduled date associated with the mention of the place of interest and adjust crowdedness predictions accordingly.

The crowdcasting program 122 trains one or more models based on the calculated features and measured user data using machine learning techniques, such as linear regression, tree-based regression, support vector machine regression, and neural networks (step 210). The trained model can then predict a crowdedness score for a given input of calculated features. In the example embodiment, the crowdcasting program 122 uses hyperparameter optimization, more specifically a grid search, to determine a set of values for the parameters of the model, e.g., N and X defined above, that output the best crowdedness predictions. Hyperparameter optimization solves the problem of identifying a set of optimal parameters for a learning algorithm. A grid search can be defined as a manually specified subset of the hyperparameter space of a learning algorithm that outputs the set of values (the values of N and X) that achieved the best results in the validation process. In the example embodiment, the crowdcasting program 122 automatically identifies the maximum values for N and X that will output the most accurate crowdedness predictions. In further embodiments, user inputted maximums may be considered.

In the example embodiment, the crowdcasting program 122 collects training data for a window of at least one year for a given place of interest. For each day of the training period, the training data consists of the calculated features and measured user data. The crowdcasting program 122 then sets a finite set of reasonable values for each parameter based on the previously determined maximum values for each parameter (step 208, continued, and trains a support vector machine with each set of values. In general, support vector machines are supervised learning models with associated learning algorithms that analyse data used in classification and regression analysis. In the example embodiment, the crowdcasting program 122 evaluates the performance of each set of values on a held-out validation set. In further embodiments, the crowdcasting program 122 may evaluate the performance of the set by performing internal cross-validation on the training set, in which case multiple support vector machines are trained per pair. In general, the output of the model will consist of the N values that achieved the highest score in the validation procedure, as well as the regression analysis or classification algorithm that the model has been automatically trained with.

In the example embodiment, a model is trained for each location and retrained periodically. Retraining frequency of the model as well as the training windows may take into consideration seasons, holidays, annual events, and sporting/event schedules. For example, the crowdcasting program 122 may train a model for a sports stadium based on historical data from the sports season of the previous year.

In further embodiments, wherein smaller places of interest may not have enough data to train a model accurately, models may be derived for the place of interest using a combination of geographic distances, business categories, as well as metric distances. A single model is then trained for a given geographic area and a business category cluster.

In furthering the previous example, the first-floor restaurant may not have enough customers who use the crowdcasting client application 112 for the crowdcasting program 122 to collect sufficient training data. The crowdcasting program 122 may then aggregate the data for all the restaurants within a one-mile radius and train a single model. The crowdedness of any given restaurant within that radius may be calculated either by using the model's prediction as is, or by weighing the prediction using historical occupancy data for each restaurant.

In further embodiments, crowdedness of a place can be broken down by origin, for example distinguishing locals from tourists. In these embodiments, the crowdcasting program 122 trains two models; one for tourists, and one for locals. In these embodiments, the crowdcasting program 122 determines a radial distance from the point of interest in which any user of the computing device 110 living outside of such radial area becomes classified as a tourist.

In furthering the previous example, the crowdcasting program 122 trains a model to determine the hourly forecast for the first-floor restaurant having optimized parameters of N and X as follows: the number of users during the same 7 day period the year before, the number of users on the 3 most recent same week days, the number of users in the past 10 days, the number of users in the same 7 day period the month before, the number of users the day before, the chance of precipitation at time X, the temperature at time X, the wind speed at time X, as well as the UV index at time X.

The crowdcasting program 122 receives a place of interest and a time at which a user wishes to visit the received place of interest (step 212). In the example embodiment, the user inputs the place of interest and the desired time via the crowdcasting client application 112, which the crowdcasting program 122 received via the network 108. In the example embodiment, the crowdcasting program 122 provides options to view a 10-day crowdedness forecast or an hourly crowdedness forecast for the place of interest.

Continuing the example above, for instance, the crowdcasting program 122 receives the beach as a place of interest and the fourth of July as a time.

The crowdcasting program 122 applies the model to predict a crowdedness of the place of interest at the received time (step 214). In the example embodiment, the crowdcasting program 122 applies the model to the desired location and desired hour/day in order to output a predicted value for the crowdedness of the point of interest. In the example embodiment, the crowdcasting program 122 outputs the crowdedness prediction as a percent relative to average crowds, e.g., 20% more crowded than usual. In other embodiments, the crowdcasting program 122 may output a score on a scale of 1 (least crowded) to 5 (most crowded), or an estimated number of patrons visiting the place of interest. In further embodiments, the output value may be a ratio of users to area, a ratio of users to employees if applicable, a ratio of users to available parking, fit to a nominal scale, fit to an ordinal scale, fit to an interval scale, or the like.

In furthering the previous example, the crowdcasting program 122 applies the features calculated for the beach to the model in order to output a crowdedness level of the beach as "5" for the fourth of July.

Figure 3:
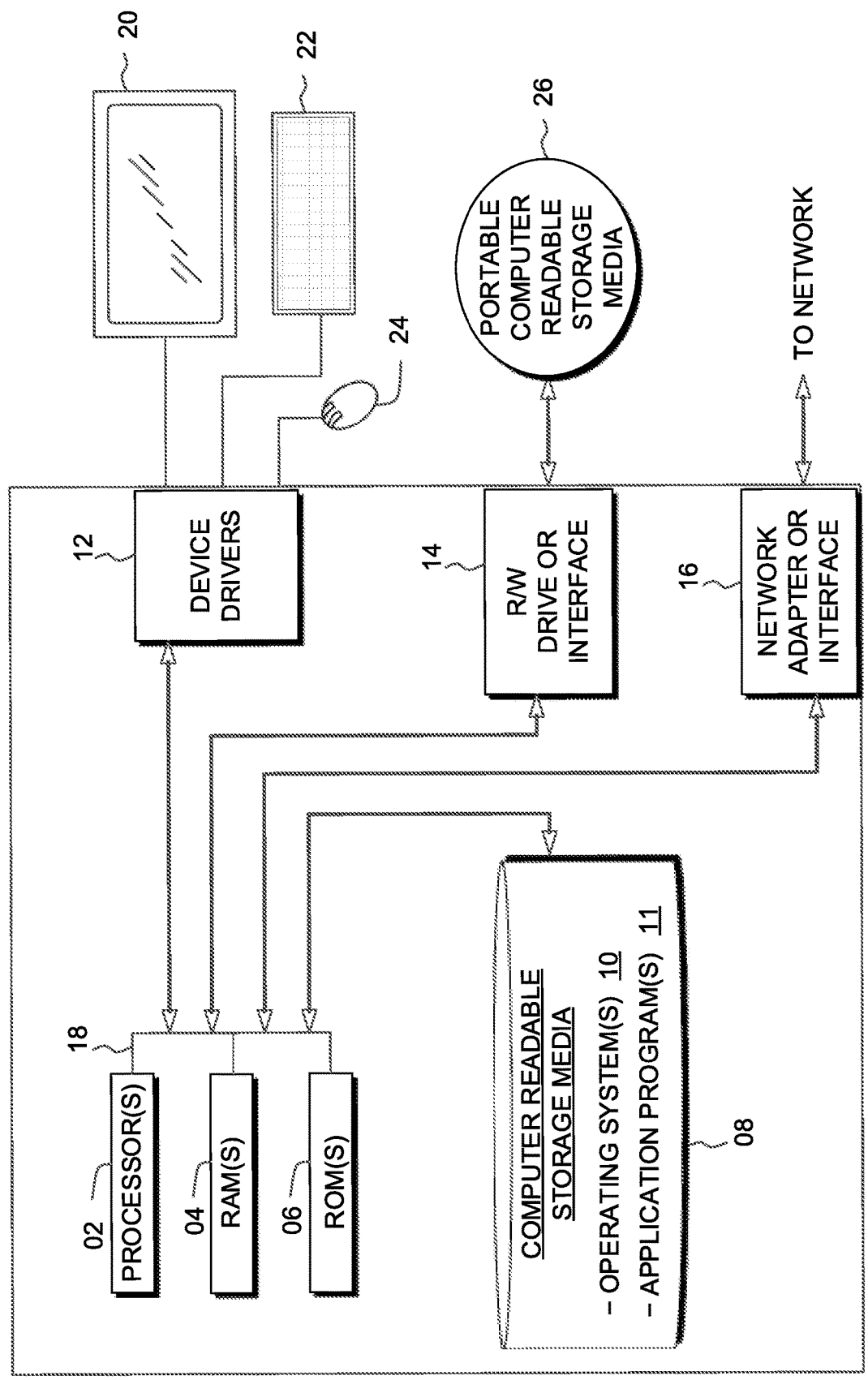
FIG. 3 depicts a block diagram depicting the hardware components of the crowdcasting system 100 of FIG. 1, in accordance with an embodiment of the present invention.
Figure 4:
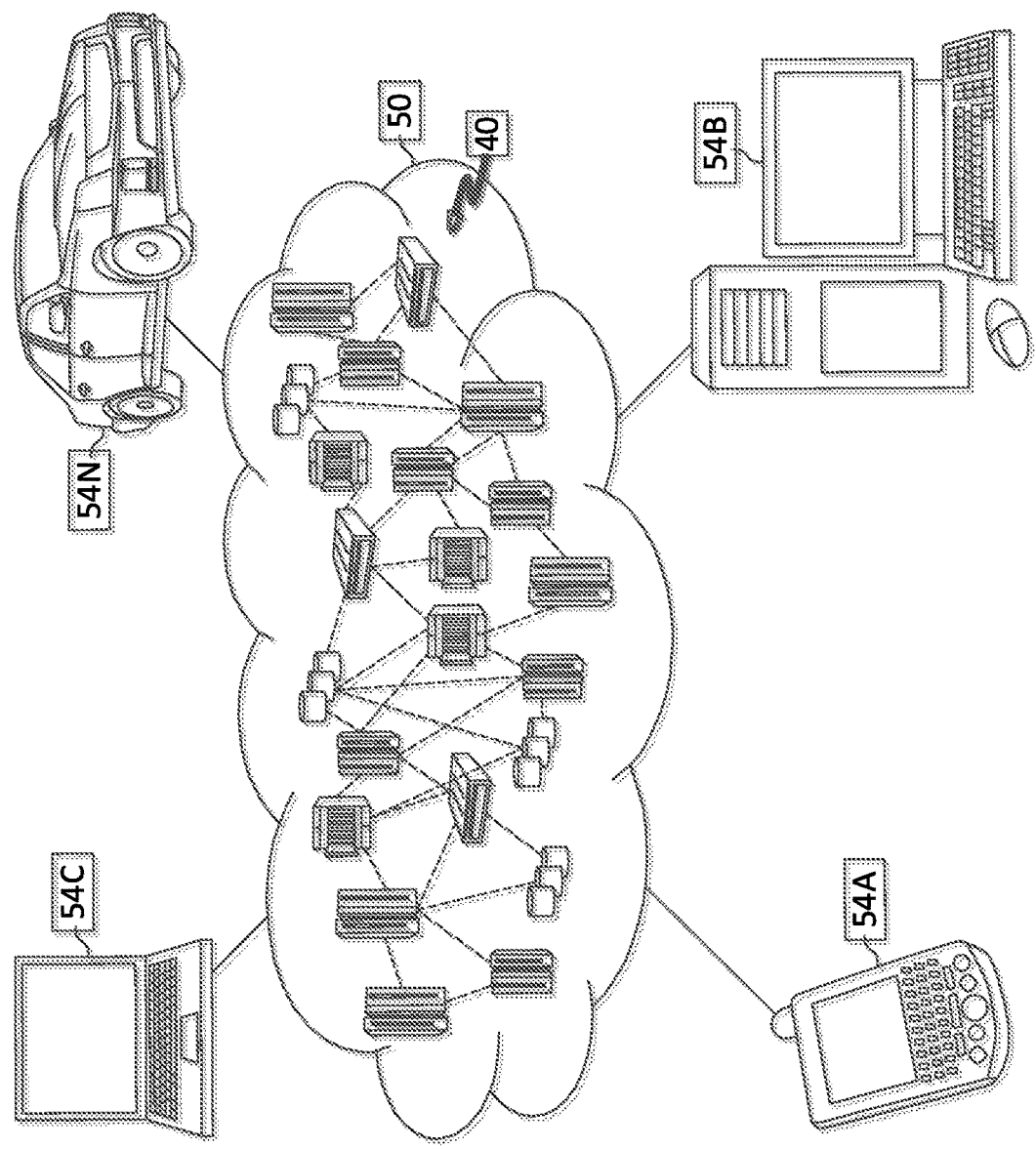
FIG. 4 depicts a cloud computing environment, in accordance with an embodiment of the present invention.

FIG. 3 depicts a block diagram of computing device 110 and server 120 of the crowdcasting system 100 of FIG. 1, in accordance with an embodiment of the present invention. It should be appreciated that FIG. 4 provides only an illustration of one implementation and does not imply any limitations with regard to the environments in which different embodiments may be implemented. Many modifications to the depicted environment may be made.

Computing device 110 may include one or more processors 02, one or more computer-readable RAMs 04, one or more computer-readable ROMs 06, one or more computer readable storage media 08, device drivers 12, read/write drive or interface 14, network adapter or interface 16, all interconnected over a communications fabric 18. Communications fabric 18 may be implemented with any architecture designed for passing data and/or control information between processors (such as microprocessors, communications and network processors, etc.), system memory, peripheral devices, and any other hardware components within a system.

One or more operating systems 10, and one or more application programs 11, for example interaction prediction program 142, are stored on one or more of the computer readable storage media 08 for execution by one or more of the processors 02 via one or more of the respective RAMs 04 (which typically include cache memory). In the illustrated embodiment, each of the computer readable storage media 08 may be a magnetic disk storage device of an internal hard drive, CD-ROM, DVD, memory stick, magnetic tape, magnetic disk, optical disk, a semiconductor storage device such as RAM, ROM, EPROM, flash memory or any other computer-readable tangible storage device that can store a computer program and digital information.

Computing device 110 may also include a R/W drive or interface 14 to read from and write to one or more portable computer readable storage media 26. Application programs 11 on said devices may be stored on one or more of the portable computer readable storage media 26, read via the respective R/W drive or interface 14 and loaded into the respective computer readable storage media 08.

Computing device 110 may also include a network adapter or interface 16, such as a TCP/IP adapter card or wireless communication adapter (such as a 4G wireless communication adapter using OFDMA technology). Application programs 11 on said computing devices may be downloaded to the computing device from an external computer or external storage device via a network (for example, the Internet, a local area network or other wide area network or wireless network) and network adapter or interface 16. From the network adapter or interface 16, the programs may be loaded onto computer readable storage media 08. The network may comprise copper wires, optical fibers, wireless transmission, routers, firewalls, switches, gateway computers and/or edge servers.

Computing device 110 may also include a display screen 20, a keyboard or keypad 22, and a computer mouse or touchpad 24. Device drivers 12 interface to display screen 20 for imaging, to keyboard or keypad 22, to computer mouse or touchpad 24, and/or to display screen 20 for pressure sensing of alphanumeric character entry and user selections. The device drivers 12, R/W drive or interface 14 and network adapter or interface 16 may comprise hardware and software (stored on computer readable storage media 08 and/or ROM 06).

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

Based on the foregoing, a computer system, method, and computer program product have been disclosed. However, numerous modifications and substitutions can be made without deviating from the scope of the present invention. Therefore, the present invention has been disclosed by way of example and not limitation.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 5:
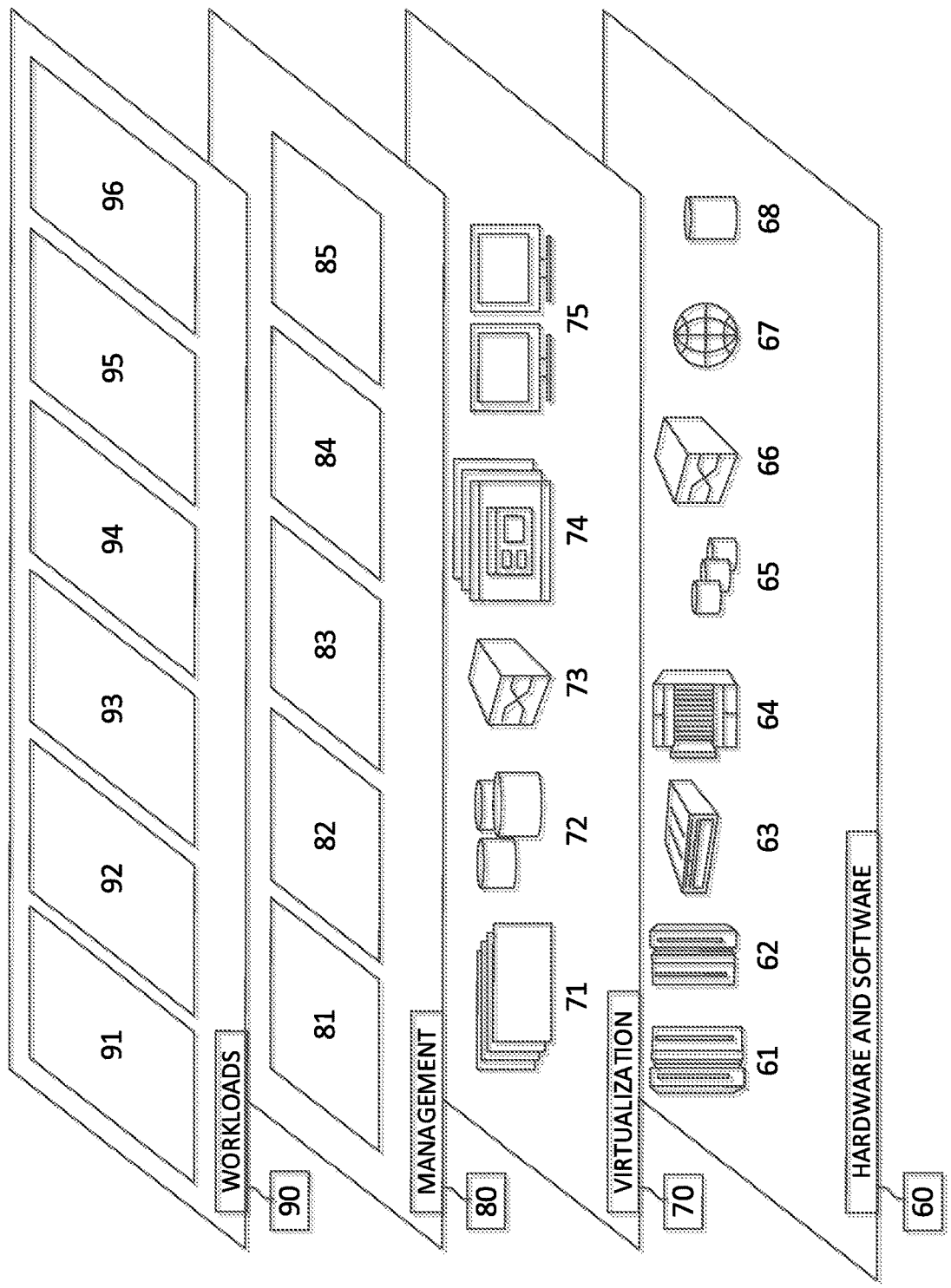
FIG. 5 depicts abstraction model layers, in accordance with an embodiment of the present invention.

Referring now to FIG. 5, illustrative cloud computing environment 50 is depicted. As shown, cloud computing environment 50 includes one or more cloud computing nodes 40 with which local computing devices used by cloud consumers, such as, for example, personal digital assistant (PDA) or cellular telephone 54A, desktop computer 54B, laptop computer 54C, and/or automobile computer system 54N may communicate. Nodes 40 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 4 are intended to be illustrative only and that computing nodes 40 and cloud computing environment 50 can communicate with any type of computerized device over any type of network and/or network addressable connection (e.g., using a web browser).

Referring now to FIG. 5, a set of functional abstraction layers provided by cloud computing environment 50 (FIG. 4) is shown. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and [PROCESSING] 96.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The invention claimed is:

1. A computer-implemented method performed by one or more processors for predicting a crowdedness of a specified location, the method comprising:
   training a crowdedness prediction model using machine learning by defining one or more geofences around one or more locations, defining one or more features of the one or more locations, collecting historic data relevant to the one or more features within the one or more geofences, and calculating one or more coefficients corresponding to the one or more features based on the collected historic data by using a grid search;
   receiving a specified location;
   receiving current data relevant to the one or more features within a geofence of the specified location;
   filtering out current data irrelevant to a crowdedness of the specified location, resulting in filtered data;
   inputting the filtered data into the trained crowdedness prediction model;
   predicting a crowdedness of the specified location based on the crowdedness prediction model;
   outputting the predicted crowdedness of the specified location as a metric selected from the group consisting of a number of estimated users, a percentage indicative of crowdedness relative to average crowds, a ratio of users to an area of a geofence of the specified location, a ratio of users to employees of the specified location, and a ratio of users to parking; and
   periodically retraining the crowdedness prediction model using machine learning based on one or more retraining features.

2. The method of claim 1, wherein collecting historic data relevant to the one or more features within the one or more geofences further comprises:
   filtering non-consumers present within a geofence of the specified location from the collected historic data; and
   normalizing the collected historic data.

3. The method of claim 1, wherein the one or more features of the one or more locations are selected from the group consisting of:
   a number of users during a same N day period in a prior year, a number of users on a N most recent same week days, a number of users in a past N days, a number of users on a same N day period in a prior month, the number of users a day before, a number of users within an N mile radius within a past day, a percent chance of precipitation, a temperature, a windspeed, a humidity, a UV index, a time of sunrise, and a time of sunset.

4. The method of claim 1, wherein:
   the one or more retraining features include one or more retraining features selected from the group consisting of:
   seasons, holidays, annual events, and sporting events.

5. A computer program product for predicting a crowdedness of a specified location, the computer program product comprising:
   one or more computer-readable storage media and program instructions executable by one or more processors stored on the one or more computer-readable storage media, the program instructions comprising:
   program instructions to train a crowdedness prediction model using machine learning by defining one or more geofences around one or more locations, defining one or more features of the one or more locations, collecting historic data relevant to the one or more features within the one or more geofences, and calculating one or more coefficients corresponding to the one or more features based on the collected historic data by using a grid search;
   program instructions to receive a specified location;
   program instructions to receive current data relevant to the one or more features within a geofence of the specified location;
   program instructions to filter out current data irrelevant to a crowdedness of the specified location, resulting in filtered data; program instructions to input the current data into the trained crowdedness prediction model;
   program instructions to predict a crowdedness of the specified location based on the crowdedness prediction model;
   program instructions to output the predicted crowdedness of the location as a metric selected from the group consisting of a number of estimated users, a percentage indicative of crowdedness relative to average crowds, a ratio of users to an area of a geofence of the location, a ratio of users to employees of the location, and a ratio of users to parking; and
   program instructions to periodically retrain the crowdedness prediction model using machine learning based on one or more retraining features.

6. The computer program product of claim 5, wherein the program instructions to collect historic data relevant to the one or more features within the one or more geofences further comprises:
   program instructions to filter non-consumers present within a geofence of the specified location from the collected historic data; and
   program instructions to normalize the collected historic data.

7. The computer program product of claim 5, wherein the one or more features of the one or more locations are selected from the group consisting of:
   a number of users during a same N day period in a prior year, a number of users on a N most recent same week days, a number of users in a past N days, a number of users on a same N day period in a prior month, the number of users a day before, a number of users within an N mile radius within a past day, a percent chance of precipitation, a temperature, a windspeed, a humidity, a UV index, a time of sunrise, and a time of sunset.

8. The computer program product of claim 5, wherein:
the one or more retraining features include one or more retraining features selected from the group consisting of:
seasons, holidays, annual events, and sporting events.

9. A computer system for predicting a crowdedness of a specified location, the computer system comprising:
one or more computer processors, one or more computer-readable storage media, and program instructions stored on one or more of the computer-readable storage media for execution by at least one of the one or more processors, the program instructions comprising:
program instructions to train a crowdedness prediction model using machine learning by defining one or more geofences around one or more locations, defining one or more features of the one or more locations, collecting historic data relevant to the one or more features within the one or more geofences, and calculating one or more coefficients corresponding to the one or more features based on the collected historic data by using a grid search;
program instructions to receive a specified location;
program instructions to receive current data relevant to the one or more features within a geofence of the specified location; program instructions to filter out current data irrelevant to a crowdedness of the specified location, resulting in filtered data;
program instructions to input the current data into the trained crowdedness prediction model;
program instructions to predict a crowdedness of the specified location based on the crowdedness prediction model;
program instructions to output the predicted crowdedness of the location as a metric selected from the group consisting of a number of estimated users, a percentage indicative of crowdedness relative to average crowds, a ratio of users to an area of a geofence of the location, a ratio of users to employees of the location, and a ratio of users to parking; and
program instructions to periodically retrain the crowdedness prediction model using machine learning based on one or more retraining features.

10. The computer system of claim 9, wherein the program instructions to collect historic data relevant to the one or more features within the one or more geofences further comprises:
program instructions to filter non-consumers present within a geofence of the specified location from the collected historic data; and
program instructions to normalize the collected historic data.

11. The computer system of claim 9, wherein the one or more features of the one or more locations are selected from the group consisting of:
a number of users during a same N day period in a prior year, a number of users on a N most recent same week days, a number of users in a past N days, a number of users on a same N day period in a prior month, the number of users a day before, a number of users within an N mile radius within a past day, a percent chance of precipitation, a temperature, a windspeed, a humidity, a UV index, a time of sunrise, and a time of sunset.

* * * * *